United States Patent [19]

Brochet

[11] 4,291,155

[45] Sep. 22, 1981

[54] METHOD OF MAKING LACTONE-EPOXIDE COPOLYMER POLYOLS

[75] Inventor: Jacques Brochet, Bethune, France

[73] Assignee: Chimiques Ugine Kuhlmann, Courbevoie, France

[21] Appl. No.: 20,343

[22] Filed: Mar. 14, 1979

[30] Foreign Application Priority Data

Mar. 14, 1978 [FR] France ............................. 78 07256

[51] Int. Cl.$^3$ ..................... C08G 63/08; C08G 63/10
[52] U.S. Cl. ................................... 528/358; 528/354; 560/185; 560/186
[58] Field of Search ............... 560/185, 186; 528/354, 528/358, 359

[56] References Cited

U.S. PATENT DOCUMENTS

| | | | |
|---|---|---|---|
| 2,962,524 | 11/1960 | Hostettler et al. | 260/484 |
| 3,689,531 | 9/1972 | Critchfield et al. | 260/484 A |
| 3,726,887 | 4/1973 | Pohl et al. | 260/484 A |
| 3,795,701 | 3/1974 | Jenkins et al. | 260/484 A |

FOREIGN PATENT DOCUMENTS 2240248  3/1975  France .
48-34400 10/1973  Japan .

OTHER PUBLICATIONS

Yamashita et al., "Anionic Copolymerization of β-Lactones", Die Makromolekulare Chemie 113, pp. 139-146 (1968).

*Primary Examiner*—Earl A. Nielsen
*Attorney, Agent, or Firm*—Sigalos & Levine

[57] ABSTRACT

The invention concerns a method for the manufacture of polyols, principally utilizable in the synthesis of polyurethanes, which are ester/ether copolymers with hydroxylated terminal groups obtained by the direct copolymerization of a lactone and a vicinal epoxide in the presence of a chain initiator possessing at least two labile hydrogen atoms per mole and of an alkaline catalyst.

6 Claims, No Drawings

METHOD OF MAKING LACTONE-EPOXIDE COPOLYMER POLYOLS

BACKGROUND OF THE INVENTION

The structure of the polyols obtained according to this method is known, but it has never been possible to obtain this structure industrially in an economical and practical manner. This structure is formed by the linkage of

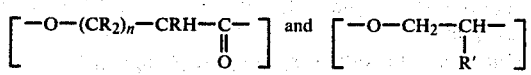

units in longer or shorter sequences, depending on the lactone/epoxide ratio, with the ends of the molecular chain being composed of hydroxylated polyether sequences.

The preparation of copolymers from lactones and epoxides is also known, but the copolymerization reaction takes place in an acid medium, more particularly in the presence of a Lewis acid. In that case, the lactone is the least active one of the monomers; the epoxide tends to react first so as to form polyether sequences and then the lactone reacts so as to form polyester sequences interspersed with ether units when the reaction velocities establish an equilibrium as a function of the concentrations of each of the monomers.

As a result, the structure of the copolymers presents itself in the form of a chain with central polyether sequences and with ends rich in polylactone sequences according to the schematic formula:

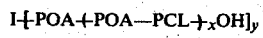

in which I represents the remainder of the initiator, POA represents the polyether sequence and PCL represents the lactone sequence.

Such a structure leads to polyols, generally solid polyols at ambient temperature no matter what the molar ratio of lactone to epoxide is, which confer upon the polyurethanes a relationship of properties to ester content which is not very advantageous as compared to classic polyether or polyester polyols in the form of homopolymers.

In U.S. Pat. No. 2,962,524 and French Pat. No. 2,240,248 procedures are described which make it possible to improve the statistical distribution of the oxylactone and oxyalkylene units noted above without, however, modifying the structure of the copolymers as shown in the schematic formula above.

These procedures are still based on the method of direct copolymerization by acid catalysis. In these procedures, the difference in reactivity between the lactone and the epoxide is compensated for either by delaying the introduction of the more reactive monomer into the copolymerization medium, with the reagents being introduced separately, or by introducing the lactone and the epoxide as a mixture at a rate below the intrinsic reaction velocity of the least reactive of the monomers in such a way as to avoid its accumulation in the reaction medium. Since any modification of the reactivity brings with it an important modification of the structure of the polyols and because of the highly exothermal character of the addition reactions of the lactone and the epoxide, it is indispensable that the reaction must be carried out at a relatively low temperature, of the order of 70° C., in order to obtain satisfactory amounts and liquid polyols in a reproducible manner. This latter temperature limitation results in a low productivity for the procedures and makes it necessary to carefully control the temperature of the medium and the concentration of the monomers during the reaction of synthesis, and this becomes expressed in relatively high manufacturing costs.

Until the appearance of the method which is the object of this invention, in spite of the imperfections as far as the process itself and its results are concerned, only the copolymerization by acid catalysis permitted the manufacture of polyols (by the copolymerization of lactones and epoxides) which were likely to be suitable for the synthesis of polyurethanes. The systematic use of acid catalysts or coordinated organometallic catalysts of the boron trifluoride or tetrabutyl titanate type probably is due to the fact that it has always been taken for granted that the preparation of polyester polyols that are homopolymers based on lactone is impossible by basic catalysis since under these conditions the homopolymerization of the lactones is described as a slow reaction leading to low conversion rates of the lactones and to bad yields. Statements to this effect can be found in: MAKROMOL. CHEM. 1968, 113, pages 139–146, "Anionic Copolymerization of Lactones in Correlation with the Mode of Fission," and MAKROMOL. CHEM. 1972, 152, pages 291–303, "Synthesis and Characterization of Several Poly-ε-caprolactones."

SUMMARY OF THE INVENTION

Unexpectedly, it has now been found that epoxides and lactones can be rapidly and economically copolymerized over wide temperature ranges and under alkaline catalysis to give high yields of copolymers especially suited for the production of polyurethanes.

Briefly stated, the present invention comprises the method of making ester-ether copolymers with hydroxylated terminal groups comprising copolymerizing a lactone and a vicinal epoxide in the presence of a chain initiator having at least two labile (active) hydrogen atoms per mole and of an alkaline catalyst; the resultant copolymers have a structure which gives the most desirable properties to polyurethanes made using the same.

DETAILED DESCRIPTION

The instant method results in the formation of polyols that are poly(ester/ether) copolymers whose molecular weights fall between 200 and 10,000 and which can be liquid, viscous (pasty), or solid at ambient temperature, depending on the lactone/epoxide ratio. The structure of the polyols obtained is in the form of a chain having central polylactonic and polyether sequences (segments) at the ends and can be represented by the following schematic formula:

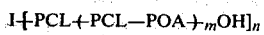

in which I represents the remainder of the initiator, PCL represents a lactonic polyester sequence, POA represents a polyether sequence, m has a mean value less than 2, and n is an integer of from 2 to 6.

It has likewise been discovered that the polyols possessing this type of structure confer the most appropriate relationship of properties to ester content upon polyurethanes made therefrom.

For the purpose of obtaining the polyol in the form of the copolymer, although it is obvious that a minimum quantity of epoxide is indispensable for the complete and rapid polyaddition of the lactone onto the initiator having labile hydrogen atoms, it should be noted that this minimum quantity can be very small, possibly below 5% by weight in the copolymer, and that in that case the copolymer obtained exhibits the characteristics of the homopolymer (obtained according to any known process whatever) of the lactone having been used.

Conversely, if the epoxide content is increased in relation to the lactone, it is possible to obtain the entire range of copolymers, as a function of the lactone/epoxide ratio, until obtaining the homopolyether at the limit.

The structures of the particular copolymers of lactone and epoxide obtained by varying the proportions thereof can be determined by differential thermal analysis and by nuclear magnetic resonance.

In order to facilitate the process of the present invention, it is preferred to introduce the lactone and the epoxide into a suitable reactor, containing the initiator and the catalyst in the required proportions, at a constant rate in such a way that the corrected pressure remains practically constant during the duration of introduction for a given reaction temperature. The lactone and the epoxide can be introduced into the reaction medium either as a mixture or as separate streams of material. Any of the usual reactors used for this type of reaction can be used in carrying out the instant process.

The corrected pressure is defined by the following formula:

$$\text{Corrected pressure} = P_m - \frac{P_i \times V_i}{V_t} = P_m - \frac{P_i \times V_i}{V_i - D \times t}$$

in which:

$p_m$ = the pressure measured at instant t
$P_i$ = the initial pressure of the vapor phase
$V_i$ = the initial volume of the vapor phase
$V_t$ = the volume of the vapor phase at instant t
t = the elapsed time from start of monomer introduction to time of measurement of pressure $P_m$
D = the volumetric flow rate of monomer introduction The copolymerization reaction is almost terminated when the introduction of the monomers is complete; the degrees of conversion of the lactone and the epoxide are close to 1, with efficiencies from 100% to 70% depending on the desired molecular weight of the polyol, the efficiency being defined by the formula:

$$\frac{\text{sought theoretical molecular weight}}{\text{measured mean molecular weight in numbers}} \times 100$$

The achievable introduction rates are very much higher than those which are accessible by the other known methods. These rates depend above all on the epoxide concentration in the mixture of monomers; according to the method of the invention the epoxide reacts much more slowly than does the lactone, but its reaction rate, under the conditions chosen so that it will be at its maximum, remains identical to the rate which it exhibits in homopolymerization. The lactone reacts very rapidly; at any one instant its concentration in the reaction medium is extremely low, generally below the sensitivity threshold of its determination by gas chromatography.

When the lactone concentration is low in the mixture to be introduced, the hourly production capacity is close to that of the polymerization of the epoxide. If the lactone concentration is increased, the hourly production capacity increases in the same proportions. As an example: the introduction rate of the lactone onto an initiator such as ethylene glycol, for a molar ratio of lactone/ethylene oxide of 2 to 6, is of the order of 10 moles of lactone/hour/mole of glycol, while the maximum introduction rate of the lactone according to a process by acid catalysis, such as the one described in French Pat. No. 2,240,248, is of the order of 0.5 moles of lactone/hour.

During the introduction of the lactone and the epoxide, it is recommended that the temperature in the reactor be maintained between 20° and 160° C. for pressures between 1 and 15 bars.

During the course of copolymerization, the process according to the invention does not require any control of the concentrations in monomers; the measurements of temperature and pressure suffice for the control of the reaction rate. The molecular weight, the functionality, and the lactone/epoxide ratio of the copolymer can be determined directly by fixing the composition of the mixture of reagents initially.

The quality of the products obtained can be controlled by a simple measurement of the kinematic viscosity in an Ubelhode tube and of the molecular weight by a determination of the hydroxyl groups. It is known that the polyols intended for the synthesis of polyurethanes must be devoid of all traces of catalyst and carefully dehydrated. And so, it is possible at the end of the process, after the introduction of the monomers and completion of the reaction, to neutralize the catalyst by means of a strong acid, to dehydrate preferably in vacuo, and to filter the final product preferably in the hot state under the pressure of an inert gas.

All alkaline catalysts are suitable for the process according to the invention, with the most usual ones being those of the sodium and potassium family. Preferably, they are in the form of the hydroxide or alcoholate. The quantities of catalyst utilized generally range between 0.01 and 0.1 mole per kilogram of polyol to be manufactured.

The chain initiator possessing at least two mobile (active) hydrogen atoms per mole can be a polyfunctional alcohol, preferably containing 2 to 6 hydroxyl groups, such as ethylene glycol, propylene glycol, butane diol, glycerol, neopentyl glycol, trimethylol propane, pentaerythritol, or sorbitol; or it can also be an amine, a mercaptan, a phenol or even a polycarboxylic acid.

The lactone used is a compound having the formula:

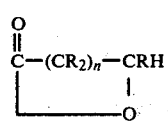

in which n preferably is an integer between 3 and 6; at least n+2 of the R's are hydrogen atoms, while the other R's can be selected from methyl, ethyl, n-propyl and isopropyl groups, as well as from hydrogen, chlorine and bromine atoms, provided that there are no more than two halogen atoms. The preferred lactones are ε-caprolactones and, more particularly, ε-caprolactone and methyl-ε-caprolactone and even mixtures thereof.

The epoxides suitable for the process are compounds containing an oxirane or oxetane ring or mixtures thereof. Preferred epoxides are oxiranes and oxetanes substituted by alkyl or aryl radicals, chlorosubstituted alkyl or aryl radicals, alkoxy radicals or aryloxy radicals. Examples are ethylene oxide, propylene oxide, butylene oxide, styrene oxide and epichlorohydrin.

As has already been pointed out, the polyols in the form of copolymers prepared according to the process which is the object of the invention are particularly well suited for the synthesis of polyurethanes. They react advantageously with the organic polyisocyanates under the usual conditions of polyurethane manufacture. The conditions for the reaction of the polyols and the polyisocyanates have been adequately described in the literature, so that one skilled in this art can use these polyols in the form of copolymers without any difficulty in the synthesis of polyurethanes. In this connection, reference is made, in particular, to French Pat. No. 2,240,248 which describes the use of polyols having a lactone base for the manufacture of polyurethanes.

The invention will be further described in connection with the examples that follow which are given for purposes of illustration only.

EXAMPLE 1

In an autoclave, equipped with an agitator, from which the air has previously been purged by means of nitrogen, 108 g. of monoethylene glycol and 4.7 g. of potassium hydroxide (containing 85% KOH in the form of pellets) are heated to 100° C., while being swept with nitrogen, for one hour. The polymerization initiator is thus formed. The temperature is then raised to 135° C. under a pressure of 2 bars of nitrogen and a mixture consisting of 1,803 g. of ε-caprolactone and 2,089 g. of ethylene oxide is introduced at a constant rate selected in such a way as to prevent an accumulation of the epoxide in the autoclave, while at the same time maintaining a constant corrected pressure of 5 bars. During the entire duration of the introduction of the monomers, the reaction medium is vigorously agitated. When all of the mixture of monomers has been introduced, the agitation and the temperature are maintained until the pressure becomes stabilized.

The reaction product is then treated under a reduced pressure of 10 to 20 mm. of mercury at 135° C. in order to eliminate the possibility of any monomers not having reacted. The copolymer is neutralized with phosphoric acid and then treated with magnesium silicate under reduced pressure in order to simultaneously eliminate the potassium and the water.

After filtration in the hot state, the copolymer is a viscous liquid having a hydroxyl value of 55.0, an acid number of 0.9, and a mean molecular weight in numbers of 2,010 g mol$^{-1}$.

EXAMPLES 2 to 9

The method of Example 1 is used, but the particular initiator and the composition of the monomer mixture are modified in a series of eight reactions. Table I shows all of the reagents and the characteristics of the products obtained.

TABLE I

| Ex. | Polyol Initiator Type | Weight in grams | Catalyst Type | Catalyst Weight in grams | ε-caprolactone weight in grams | Ethylene oxide weight in grams | Introduction rate in grams/hour | Molar $\frac{CL}{OE}$ ratio in the copolymer | IOH | $\overline{Mn}$ | ICooh | Appearance at 20°C. | Viscosity at 45° C. in centipoise |
|---|---|---|---|---|---|---|---|---|---|---|---|---|---|
| 2 | glycol | 108 | KOH | 4.7 | 1,803 | 2,089 | 330 | 0.33 | 55.0 | 2,010 | 0.9 | Cloudy liquid | 400 |
| 3 | glycol | 99 | KOH | 3.5 | 1,483 | 1,145 | 400 | 0.50 | 65.6 | 1,700 | 0.6 | Cloudy liquid | 390 |
| 4 | glycol | 108 | KOH | 4.7 | 2,808 | 1,084 | 680 | 1.0 | 53.9 | 2,050 | 0.9 | Pasty solid | 630 |
| 5 | glycol | 99 | KOH | 3.8 | 2,012 | 388 | 1,200 | 2.0 | 66.5 | 1,660 | 1.1 | Solid | 584 |
| 6 | glycol | 94.3 | KOH | 4.1 | 3,200 | 206 | 1,300 | 6.0 | 51.7 | 2,130 | 1.0 | Solid | 1,105 |
| 7 | neopentylglycol | 208 | KOH | 4.7 | 2,140 | 1,652 | 400 | 0.50 | 61.7 | 1,790 | 0.9 | Clear liquid | 400 |
| 8 | glycerol | 147 | KOH | 4.7 | 2,780 | 1,073 | 680 | 1.0 | 70.7 | 2,350 | 0.9 | Pasty | 640 |
| 9 | glycol | 124 | NaOH | 4 | 2,187 | 1,689 | 400 | 0.50 | 62.3 | 1,770 | 1.1 | Cloudy liquid | 400 |

$\frac{CL}{OE}$ = molar ratio of $\frac{\text{ε-caprolactone}}{\text{ethylene oxide}}$ corresponding to the composition of the copolymer
IOH = hydroxyl value
$\overline{Mn}$ = mean molecular weight in numbers
Icooh = acid number

EXAMPLE 10

The method of Example 1 is used except that the reaction is carried out at 115° C. instead of 135° C. As to the reagents, ethylene oxide is replaced by propylene oxide and the quantities of the reagents are the following:

for the initiator: 93 g. of glycol and 10.6 g. of potassium hydroxide containing 85% KOH.
for the mixture of monomers: 1,927 g. of ε-caprolactone and 980 g. of propylene oxide.

The copolymer which is obtained is a cloudy liquid having a hydroxyl value of 73.5, an acid number of 1.1. and a mean molecular weight in numbers of 1,505. Its viscosity at 45° C. is 370 cps and the molar ratio of (ε-caprolactone/propylene oxide) amounts to 1.0.

EXAMPLE 11

The method of Example 1 is used. The polymerization initiator is composed of 147 g. of glycerol and 2.6 g. of potassium hydroxide. The monomer mixture is composed of 2,553 g. of ε-caprolactone and 1,300 g. of propylene oxide. The addition of monomers takes place at 115° C. at a rate of 260 g. per hour. The polyol which is obtained in a viscous liquid having a hydroxyl value of 73.2, an acid number of 0.3, and a mean molecular weight in numbers of 2,290. The molecular ratio of (ε-caprolactone/propylene oxide) in the polymer is equal to 1.

EXAMPLES 12 to 15

A series of elastomers is made in a vessel adapted to the manufacture of polyurethanes and equipped with a thermometer, an agitator capable of turning at 2,000 RPM, and a device making it possible to create a vacuum. In each reaction a polyol of one of the preceding examples, in the form of the anhydrous copolymer, is mixed at ambient temperature with 1:4-butanediol at the rate of 10 to 20 parts of 1:4-butanediol by weight per 100 parts of polyol in the form of the copolymer, and a diisocyanate in the molecular ratio of (NCO/total OH) of 1.05.

The diisocyanate is almost a prepolymer at 5.47 NCO/kg, being basically diisocyanato-diphenylmethane and diethylene glycol (LILENE SM 1 made by the Produits Chimiques Ugine Kuhlmann Company). The mixture is agitated for one minute under reduced pressure of 1 torr in order to eliminate the dissolved gases. Triethylene diamine, at 30% by weight in dipropylene glycol, is then added as the catalyst at the rate of 1% by weight based on the weight of the polyol in the form of the copolymer. Vigorous agitation is used under reduced pressure of 1 torr until the temperature of the mixture reaches 50° C. The vacuum is broken and the reaction product is allowed to run into a hot mold from a discharge opening in the bottom of the vessel. The mold has dimensions of 3×150×200 mm. and after being filled with reaction product is placed into a drying oven at 100° C.

After an hour has elapsed, the slab of elastomer is unmolded and kept at 100° C. for 24 hours.

Table II lists the characteristics of the initial polyol mixture and shows the mechanical properties of the elastomer which has been obtained.

|  | Parts by weight |
|---|---|
| Polyol (in the form of copolymer of Example 1) | 100 |
| Stannous octoate (T9) in the form of a solution in butyl phthalate | 3.3 |
| Mixture of N, N dimethylated fatty amines (N, N-dimethyl hexadecyl amine) (aminated catalyst DM 16) | 3.3 |
| Polysiloxane as a surfactant (fluid 1310 DOW CORNING) | 1 |
| Water | 3.5 |
| High-molecular-weight hydroxyethylcellulose (Natrosol 2502) | 0.2 |

After homogenization of the mixture, 46 parts by weight of an 80:20 mixture of toluene and diisocyanate are added with vigorous agitation for 7 seconds. The resulting mixture is allowed to run into a mold and a soft (non-rigid) foam having the following characteristics is obtained:

| Cream time (sec.) | Rising time (sec.) | Tear Strength (g/cm$^{-1}$) | Tensile Strength (Kg/cm$^{-2}$) | Elongation at Break (%) | Compression Load Deflection (g/cm$^{-2}$) at % of compression: | | |
|---|---|---|---|---|---|---|---|
| | | | | | 25 | 50 | 65 |
| 15 | 75 | 925 | 1.41 | 440 | 24 | 34 | 56 |

EXAMPLE 18

For the sake of comparison, in an autoclave identical to the one of Example 1, a polyol in the form of a copolymer is prepared by acid catalysis.

12.4 g. of ethylene glycol are heated to 60° C. with 0.25 g. of the diethyl etherate of boron trifluoride, containing 47% of BF$_3$, as the catalyst. A mixture of 273.5 g. of caprolactone (2.4 Moles) and 105.5 g. of ethylene oxide (2.4 moles) is then added in 8 hours by means of a

TABLE II

| Example | Polyol in the form of copolymer according to: | Parts by weight of butanediol per 100 parts of polyol in the form of copolymer | ELASTOMER | | | | |
|---|---|---|---|---|---|---|---|
| | | | Breaking load (kg . cm$^{-2}$) | Elongation at the breaking point (%) | Young's Modulus of elasticity (100%) | Tearing strength (kg . cm$^{-1}$) | Shore A hardness |
| 12 | Example 1 | 20 | 235 | 565 | 66 | 98 | 84 |
| 13 | Example 2 | 15 | 435 | 435 | 81 | 93 | 87 |
| 14 | Example 3 | 20 | 295 | 280 | 126 | 125 | 88 |
| 15 | Example 4 | 10 | 400 | 520 | 53 | 91 | 78 |

EXAMPLE 16

1,000 g, of polyol (in the form of copolymer of Example 4) are mixed with 25 g. of 1:4-butanediol, then melted at 80° C. and dehydrated in vacuo for two hours at 80° C. The anhydrous mixture is cooled to 70° C. and then 183.75 g. of pure melted diisocyanato-diphenylmethane are added with rapid agitation. The mixture is allowed to run into a Teflon mold. It is baked at 140° C. for 12 hours and then the mold is suddenly cooled in order to unmold the polymer mass. The product which is obtained shows good adhesive properties.

EXAMPLE 17

A mixture of the following reagents is prepared:

pump feeding the autoclave at a constant rate.

The feed rate is controlled in such a way as to keep the lactone concentration below or equal to 10% by weight. The reaction mixture is subjected to vigorous agitation and is kept at 60°-70° C. during the entire addition of the mixture of the reagents. After the addition of the reagents, the temperature of the reaction mixture is kept at 60°-70° C. for 1 hour with agitation.

The resulting polyol in the form of a copolymer possesses a hydroxyl value of 62.4, an acid number of 0.7, and a mean molecular weight of 1,770.

The structure of the polyol (in the form of a copolymer) is compared to the structure of the polyol (in the form of a copolymer) of preceding Example 4 by means of a nuclear magnetic resonance examination and by means of differential thermal analysis.

Since, by means of integration of the spectra, nuclear magnetic resonance enables the calculation of the mean lengths of the polyether sequences, POA, and of the polycaprolactone sequences, PCL, as well as their mean numbers per mole of polyol in the form of a copolymer, in this way it was discovered that the sequences are much more numerous and shorter for the product manufactured by acid catalysis than they are for the product obtained according to Example 4.

The results of the differential thermal analysis (DTA) show that the distribution of the sequences in the chains is very different, depending on the type of catalysis.

The differential thermal analysis (DTA) diagram of the product obtained according to Example 4 shows an exothermal peak characteristic of polyether sequences having a molecular weight from 300 to 500 located at the end of the chain of the polyol in the form of a copolymer, while the DTA diagram of the product obtained according to the present example is characteristic of a polyol in the form of an amorphous copolymer: none of the sequences is long enough to impose its thermal behavior.

While the invention has been described in connection with preferred embodiments, it is not intended to limit the invention to particular forms set forth, but, on the contrary, it is intended to cover such alternatives, modifications and equivalents as may be included within the spirit and scope of the invention as defined by the appended claims.

What is claimed is:

1. A method for the manufacture of a copolymeric polyol comprising forming a reaction mixture of a lactone, an epoxide, a chain initiator having at least two active hydrogen atoms per mole, and an alkaline catalyst and copolymerizing at a temperature and substantially constant corrected pressure during addition of the lactone and epoxide and for a time sufficient to form a copolymeric polyol having the general formula:

wherein I represents the remainder of the initiator, PCL represents a lactonic polyester sequence, POA represents a polyether sequence, m has a mean value less than 2, and n is an integer from 2 to 6, said copolymeric polyol having a central portion predominating in polylactone segments and terminal portions predominating in polyether segments.

2. The method of claim 1 wherein the initiator is a polyfunctional alcohol containing from 2 to 6 hydroxyl groups; the catalyst is a sodium or potassium compound; the epoxide is selected from oxirane or oxetane ring-containing compounds; the lactone has the formula:

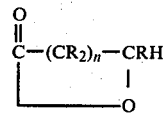

wherein n is a whole number from 3 to 6 and R is selected from hydrogen, chlorine, or bromine atoms or methyl, ethyl, n-propyl, or isopropyl groups; at least n+2 of the R's being hydrogen and the total chlorine and bromine atoms not exceeding two in number.

3. The method of claim 1 wherein the temperature is maintained between 20° to 160° C. for pressures between 1 to 15 bars.

4. The method of claim 2 wherein the catalyst is selected from a sodium or potassium hydroxide or alcoholate and is used in the amount of from 0.01 to 0.1 mole of catalyst for each kilogram of polyol to be manufactured and the lactone is selected from $\epsilon$-caprolactone, methyl-$\epsilon$-caprolactone, or mixtures thereof.

5. The method of claim 1 wherein the initiator is a polyfunctional alcohol containing 2 to 6 hydroxyl groups, the catalyst is selected from sodium hydroxide or potassium hydroxide, the lactone is selected from $\epsilon$-caprolactone, methyl-$\epsilon$-caprolactone, or mixtures thereof, the epoxide is selected from ethylene oxide, propylene oxide, butylene oxide, styrene oxide, epichlorohydrin, or mixtures thereof, and the reaction temperature is maintained between 20° to 160° C. at pressures between 1 to 15 bars.

6. The method of claim 5 wherein the catalyst is sodium hydroxide, the initiator is glycol, the lactone is $\epsilon$-caprolactone, and the epoxide is ethylene oxide.

* * * * *